(12) United States Patent
Kwon et al.

(10) Patent No.: US 7,497,539 B2
(45) Date of Patent: Mar. 3, 2009

(54) METHOD OF MANUFACTURING COLOR FILTER USING INKJET

(75) Inventors: Kye-si Kwon, Seoul (KR); Sung-woong Kim, Suwon-si (KR); Wou-sik Kim, Suwon-si (KR); Sang-il Kim, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 59 days.

(21) Appl. No.: 11/593,603

(22) Filed: Nov. 7, 2006

(65) Prior Publication Data

US 2007/0188548 A1 Aug. 16, 2007

(30) Foreign Application Priority Data

Feb. 14, 2006 (KR) .................. 10-2006-0014248

(51) Int. Cl.
*B41J 2/205* (2006.01)
*G02B 5/20* (2006.01)

(52) U.S. Cl. .................................. 347/15; 430/7

(58) Field of Classification Search ............... 347/12, 347/41, 15, 40, 43; 349/106, 155, 156; 427/162, 427/256; 430/7
See application file for complete search history.

(56) References Cited

U.S. PATENT DOCUMENTS

| 6,844,120 B2* | 1/2005 | Chen et al. ............ 430/7 |
| 7,070,890 B2* | 7/2006 | Kiguchi et al. ......... 430/7 |
| 7,331,286 B2* | 2/2008 | Baek et al. ............ 101/170 |

* cited by examiner

*Primary Examiner*—Lamson D Nguyen
(74) *Attorney, Agent, or Firm*—Stanzione & Kim, LLP

(57) ABSTRACT

A method of manufacturing a color filter using an inkjet In the method, a region of the color filter in which a plurality of nozzles are sequentially turned on is a first region, a region of the color filter in which all of the plurality of nozzles are turned on is a second region, and a region of the color filter in which the plurality of nozzles are sequentially turned off is a third region, and when the amount of ink discharged from each nozzle gradually decreases as the number of simultaneously turned-on nozzles increases, the number of ink drops discharged from each of the plurality of nozzles gradually increases in the first region and gradually decreases in the third region to maintain a uniform ink thickness over the entire color filter.

14 Claims, 8 Drawing Sheets

METHOD OF MANUFACTURING COLOR FILTER USING INKJET

CROSS-REFERENCE TO RELATED APPLICATIONS

This application claims priority under 35 U.S.C. §119(a) from Korean Patent Application No. 10-2006-0014248, filed on Feb. 14, 2006, in the Korean Intellectual Property Office, the disclosure of which is incorporated herein in its entirety by reference.

BACKGROUND OF THE INVENTION

1. Field of the Invention

The present general inventive concept relates to a method of manufacturing a color filter, and more particularly, to a method of manufacturing a color filter using an inkjet.

2. Description of the Related Art

Flat panel display devices having large screen sizes, such as liquid crystal displays (LCDs), plasma display panels (PDP), organic electro luminescence (EL), light emitting diodes, and field emission displays (FED) are today largely used. Among the flat panel display devices, the liquid crystal displays (LCDs), which are mainly used for computer monitors and notebook computer screens due to their low power consumption, are very popular.

The LCD includes a color filter for forming an image of a required color by filtering white light modulated by a liquid crystal layer. The color filter includes a plurality of red (R), green (G), and blue (B) pixels arranged in a predetermined pattern on a transparent plate. Examples of conventional methods of manufacturing a color filter are a dyeing method, a pigment dispersion method, a printing method, an electro-deposition method, and the like.

However, in the conventional methods of manufacturing a color filter, a predetermined process should be repeated for each color to form red (R), green (G), and blue (B) pixels, thereby decreasing the efficiency of the process and increasing the manufacturing cost.

Thus, recently, there has been proposed a method of manufacturing a color filter using an ink-jet, which is simpler and less expensive than the conventional methods. In the method of manufacturing the color filter using the inkjet, pixels of predetermined colors are formed by discharging ink drops of predetermined colors, for example, red (R), green (G), and blue (B) colors, in corresponding pixel areas on a plate of the color filter.

FIG. 1 is a diagram illustrating a conventional method of manufacturing a color filter 10 by discharging ink to form pixels of the color filter using an inkjet head 20. FIG. 2A is a graph illustrating a thickness of the ink discharged in pixel areas from a first nozzle 21 of the inkjet head 20 in FIG. 1 along a printing direction Y. FIG. 2B is a graph illustrating a thickness of the ink discharged in pixel areas from a fourth nozzle 24 of the inkjet head 20 in FIG. 1 along the printing direction Y. FIG. 3 is a diagram illustrating regions of the ink thicknesses illustrated in FIGS. 2A and 2B.

Referring to FIG. 1, the inkjet head 20 including a plurality of nozzles 21, 22, 23, and 24 discharges ink in each pixel area 11 while passing above the color filter 10 in the printing direction Y. The inkjet head 20 is tilted by a predetermined angle with respect to the color filter 10. After all pixel areas 11 along a column in the Y direction are filled with ink, the inkjet head 20 moves in a direction X, and then discharges ink into each pixel area 11 along an adjacent column in the direction Y. Remaining pixel areas 11 of the color filter 10 are filled with the ink by repeating the processes described above.

However, since the inkjet head 20 moves while being tilted by the predetermined angle with respect to the color filter 10, the amount of ink discharged from each of the nozzles 21, 22, 23, and 24 in pixel areas 11 at the beginning and end of the ink discharging process varies according to the number of nozzles discharging the ink.

Referring to FIGS. 1, 2A, 2B and 3, the amount of the ink discharged from the first nozzle 21 decreases gradually along the direction Y in a region I and is constant in a region II. The amount of ink discharged from the fourth nozzle 24 is constant along the direction Y in the region II and increases gradually along the direction Y in a region III.

The change in the amount of the discharged ink occurs since the number of nozzles passing through each region changes as the inkjet head 20 moves in the direction Y. In other words, in the region II, all of the four nozzles 21, 22, 23, and 24 discharge the ink, while the number of nozzles discharging the ink increases as the first nozzle 21, the second nozzle 22, the third nozzle 23, and the fourth nozzle 24 enter into the region I sequentially. On the other hand, in the region III, the number of nozzles discharging ink decreases as the fourth nozzle 24, the third nozzle 23, the second nozzle 22, and the first nozzle 21 exit the region III sequentially. Accordingly, the total amount of the ink discharged in the region I or III is more than that discharged in the region II.

The amount of discharged ink by each of the nozzles 21, 22, 23, and 24 varies based on the number of simultaneously operating adjacent nozzles since cross-talk between an operating nozzle and a non-operating nozzle occurs among the plurality of nozzles 21, 22, 23, and 24. In an opposite case, the total amount of the ink discharged in the region II may be more than that in the region I or III, as the amount of ink discharged by a nozzle decreases with an increase of nozzles simultaneously discharging ink.

The difference of the amount of the ink discharged from the same nozzle causes a difference in ink thicknesses in pixel areas, and accordingly, non-uniform thicknesses in some regions of the color filter occurs, thereby deteriorating the reliability of a color reproduction rate.

SUMMARY OF THE INVENTION

The present general inventive concept provides a method of manufacturing a color filter using an inkjet, by which a uniform ink thickness over the entire color filter is maintained.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing a method of manufacturing a color filter using an inkjet, the method including discharging ink into a plurality of pixels areas divided by a matrix using an inkjet head including a plurality of nozzles moved above the color filter while being tilted by a predetermined angle with respect to the color filter, the color filter including a first region in which the plurality of nozzles are sequentially turned on, a second region in which all of the plurality of nozzles are turned on, and a third region in which the plurality of nozzles are sequentially turned off, and when an amount of ink discharged from each of the plurality of nozzles gradually decreases and increases as the number of simultaneously turned-on nozzles increases and decreases, respectively, the number of ink drops discharged from each of the plurality of nozzles gradually increasing and decreasing in the second region and in the third region, respectively, to maintain a uniform ink thickness over the entire color filter.

The foregoing and/or other aspects and utilities of the present general inventive concept may also be achieved by providing a method of manufacturing a color filter using an inkjet, the method including discharging ink into a plurality of pixel areas divided by a matrix using an inkjet head comprising a plurality of nozzles is moved above the color filter while being tilted by a predetermined angle with respect to the color filter, the color filter including a first region in which the plurality of nozzles are sequentially turned on, a second region in which all of the plurality of nozzles are turned on, and a third region in which the plurality of nozzles are sequentially turned off, and when an amount of ink discharged from each of the plurality of nozzles gradually increases and decreases as the number of simultaneously turned-on nozzles increases and decreases, respectively, the number of ink drops discharged from each of the plurality of nozzles gradually decreasing and increasing in the first region and in the third region, respectively, to maintain a uniform ink thickness over the entire color filter.

The foregoing and/or other aspects and utilities of the present general inventive concept may also be achieved by providing a method of manufacturing a color filter using an inkjet, the method including discharging ink into a plurality of pixel areas divided by a matrix using an inkjet head comprising a plurality of nozzles is moved above the color filter while being tilted by a predetermined angle with respect to the color filter, the color filter including a first region in which the plurality of nozzles are sequentially turned on, a second region in which all of the plurality of nozzles are turned on, and a third region in which the plurality of nozzles are sequentially turned off; and when an amount of ink discharged from each of the plurality of nozzles is gradually changed according to the number of turned-on nozzles, gradually changing the number of ink drops discharged from each of the plurality of nozzles in the first region and in the third region to maintain a uniform ink thickness over the entire color filter.

The changing of the number of ink drops may include gradually decreasing the number of ink drops discharged from the nozzles in the first region when the amount of ink discharged from each nozzle gradually increases in the first region as the number of simultaneously turned-on nozzles gradually increases.

The changing of the number of ink drops may include gradually increasing the number of ink drops discharged from the nozzles in the first region when the amount of ink discharged from each nozzle gradually decreases in the first region as the number of simultaneously turned-on nozzles gradually increases.

The changing of the number of ink drops may include gradually decreasing the number of ink drops discharged from the nozzles in the third region when the amount of ink discharged from each nozzle gradually increases in the third region as the number of simultaneously turned-on nozzles gradually increases.

The changing of the number of ink drops may include gradually increasing the number of ink drops discharged from the nozzles in the third region when the amount of ink discharged from each nozzle gradually decreases in the third region as the number of simultaneously turned-on nozzles gradually increases.

The numbers of ink drops in the first and third regions corresponding to the number of the simultaneously turned-on nozzles may be the same.

The number of ink drops discharged from each of the plurality of nozzles in the second region may be set to a minimal value, and the number of drops discharged from each of the plurality of nozzles in the first and third regions may be larger than the minimal value, respectively.

The number of ink drops discharged from each of the plurality of nozzles in the second region may be set to a maximal value, and the number of drops discharged from each of the plurality of nozzles in the first and third regions may be less than the maximal value, respectively.

The foregoing and/or other aspects and utilities of the present general inventive concept may also be achieved by providing a method of manufacturing a color filter using an inkjet head having a plurality of nozzles to discharge ink, the method including determining an amount of ink to be discharged into pixel areas of the color filter to obtain a desired ink thickness, and discharging ink into the pixel areas while sequentially moving the inkjet head above the color filter, the inkjet head being at an angle with respect to the color filter, wherein the amount of ink discharged by the nozzles into each pixel area is kept uniform by changing the number of ink drops ejected by each of the nozzles.

The number of ink drops discharged by each nozzle may increase as the number of nozzles simultaneously discharging ink increases.

The number of ink drops discharged by each nozzle may decrease as the number of nozzles simultaneously discharging ink decreases.

The number of ink drops discharged by each nozzle may increase as the number of nozzles simultaneously discharging ink.

The number of ink drops discharged by each nozzle may decrease as the number of nozzles simultaneously discharging ink increases.

The foregoing and/or other aspects and utilities of the present general inventive concept may also be achieved by providing a method of controlling an inkjet head to manufacture a color filter, the method including moving the inkjet head having a plurality of nozzles arranged to have an angle with respect to the color filter, and controlling the number of ink drops ejected by the respective nozzles according to the movement of the inkjet head.

The number of inks drops ejected by the respective nozzles may increase and decrease as the number of nozzles ejecting ink into pixel areas of the color filter increases and decreases, respectively.

The number of inks drops ejected by the respective nozzles may decrease and increase as the number of nozzles ejecting ink into pixel areas of the color filter increases and decreases, respectively.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
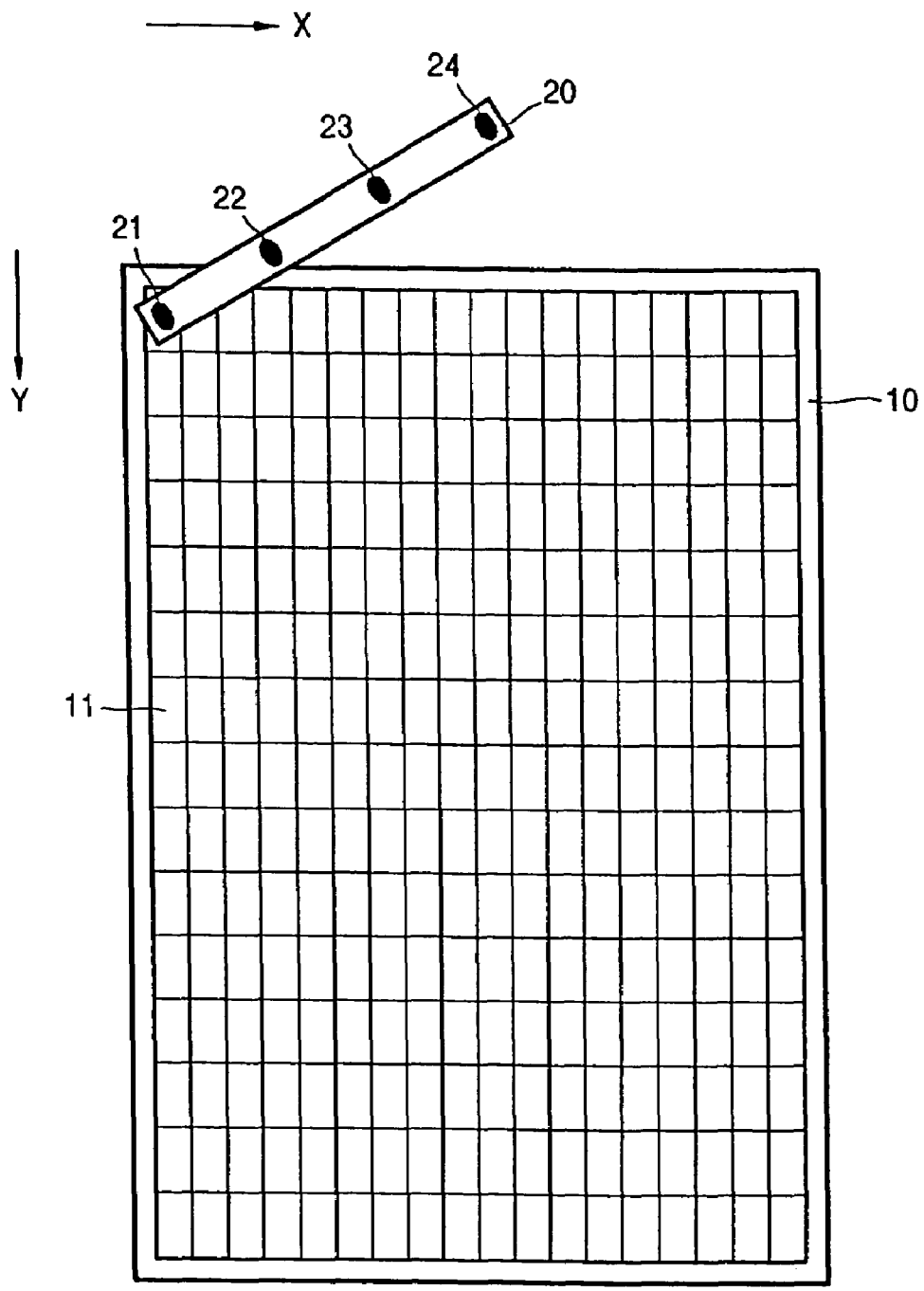
FIG. 1 is a diagram illustrating a conventional method of manufacturing a color filter by discharging ink into each pixel area of the color filter using an inkjet head.
Figure 2A:
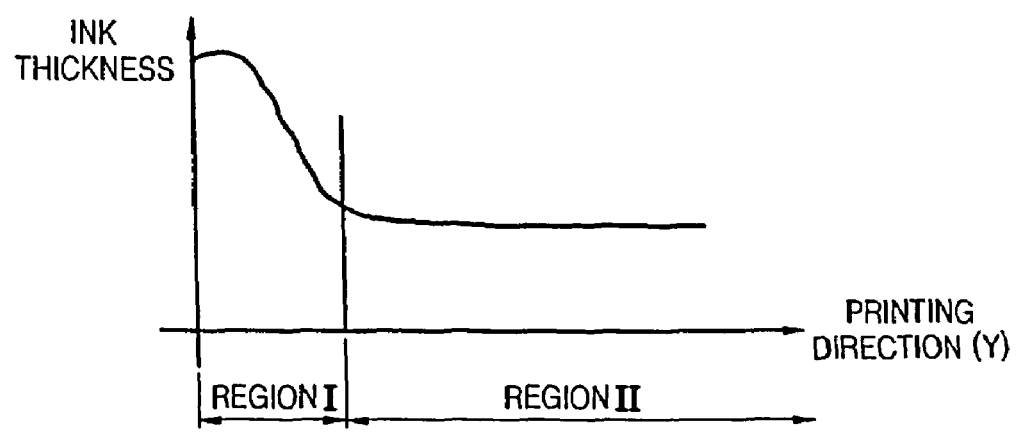
FIG. 2A is a graph illustrating a thickness of ink discharged into pixel areas from a first nozzle of the inkjet head in FIG. 1 which moves along a printing direction Y.
Figure 2B:
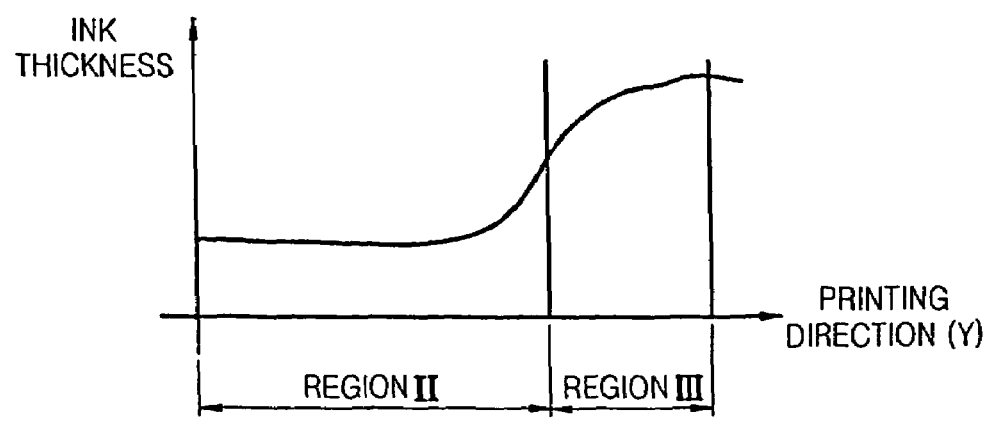
FIG. 2B is a graph illustrating a thickness of ink discharged into pixel areas from a fourth nozzle of the inkjet head in FIG. 1 which moves along the printing direction Y.
Figure 3:
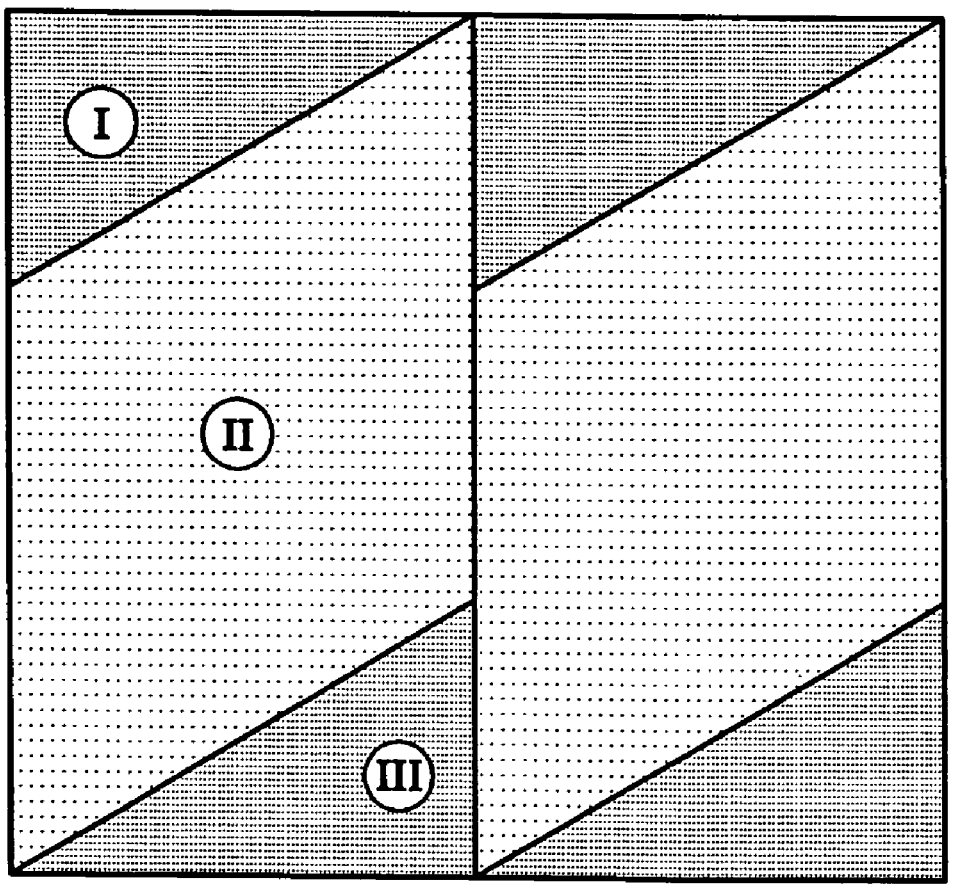
FIG. 3 is a diagram illustrating regions of the ink thicknesses illustrated in FIGS. 2A and 2B.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 4:
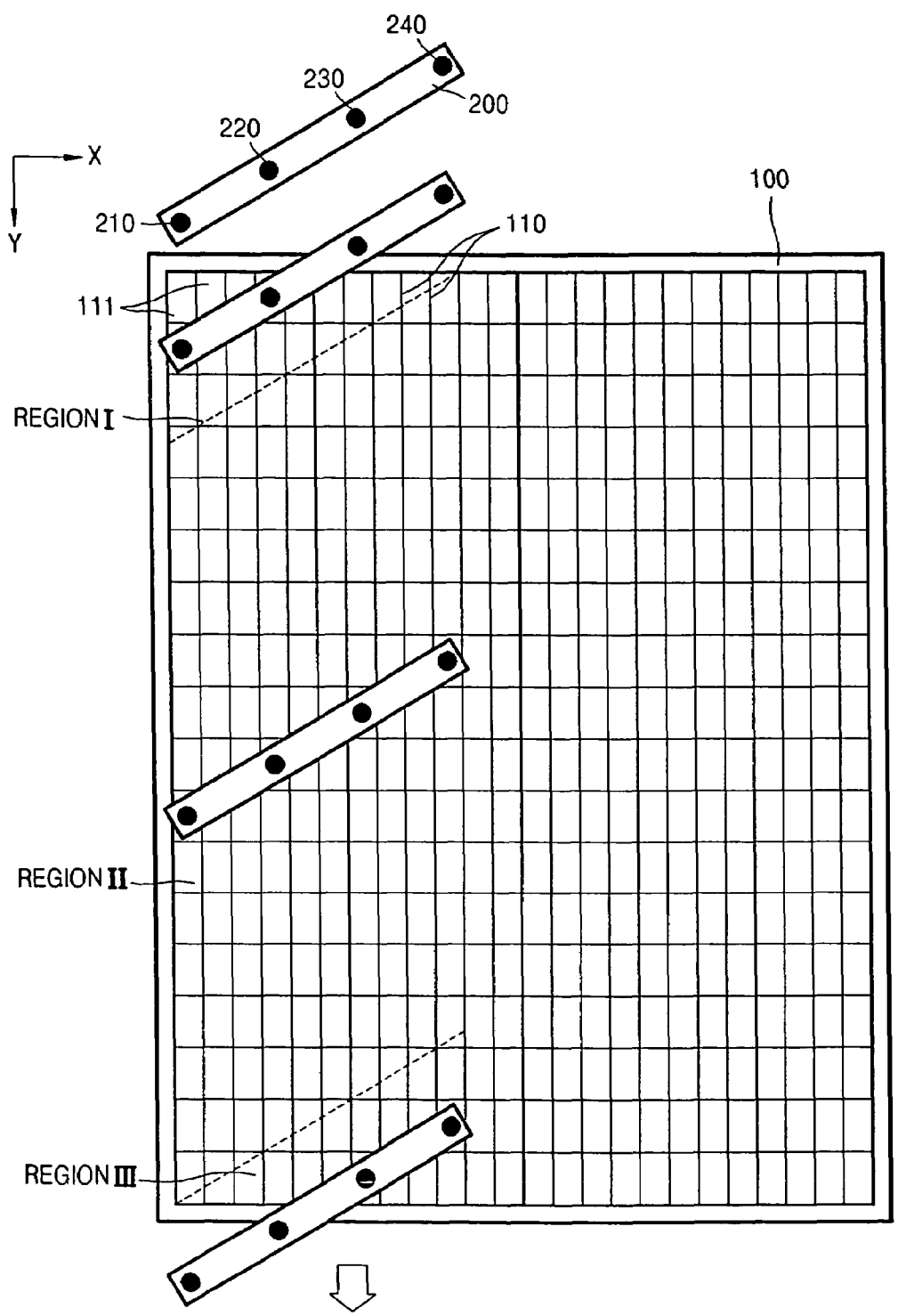
FIG. 4 is a diagram illustrating a movement of an inkjet head above a color filter according to an embodiment of the present general inventive concept.

FIG. 4 is a diagram illustrating a movement of an inkjet head 200 above a color filter 100 according to an embodiment of the present general inventive concept.

Referring to FIG. 4, the color filter 100 includes a plurality of pixel areas 111 defined by a black matrix 110. In the plurality of pixel areas 111, red (R), green (G), and blue (B) color inks are filled sequentially.

The inkjet head 200 includes four nozzles 210, 220, 230, and 240. The four nozzles 210, 220, 230, and 240 discharge ink into the plurality of the pixel areas 111 while moving above the color filter 100 in a direction Y The inkjet head 200 is tilted by a predetermined angle with respect to the color filter 100. While FIG. 4 illustrates the inkjet head as having four nozzles 210, 220, 230, and 240, the present general inventive concept is not limited thereto, and the number of nozzles included in the inkjet head 200 is not limited to four.

When the inkjet head 200 starts moving above the color filter 100 in the direction Y and enters region I of the color filer 100, not all of the nozzles 210, 220, 230, and 240 are simultaneously turned on to discharge the ink. When the inkjet head 200 passes the region I of the color filter 100, the number of simultaneously turned-on nozzles gradually increases as the inkjet head 200 moves in the direction Y On the other hand, while the inkjet head 200 passes the region III of the color filter 100, the number of simultaneously turned-on nozzles gradually decreases as the inkjet head 200 moves in the direction Y.

Figure 5:
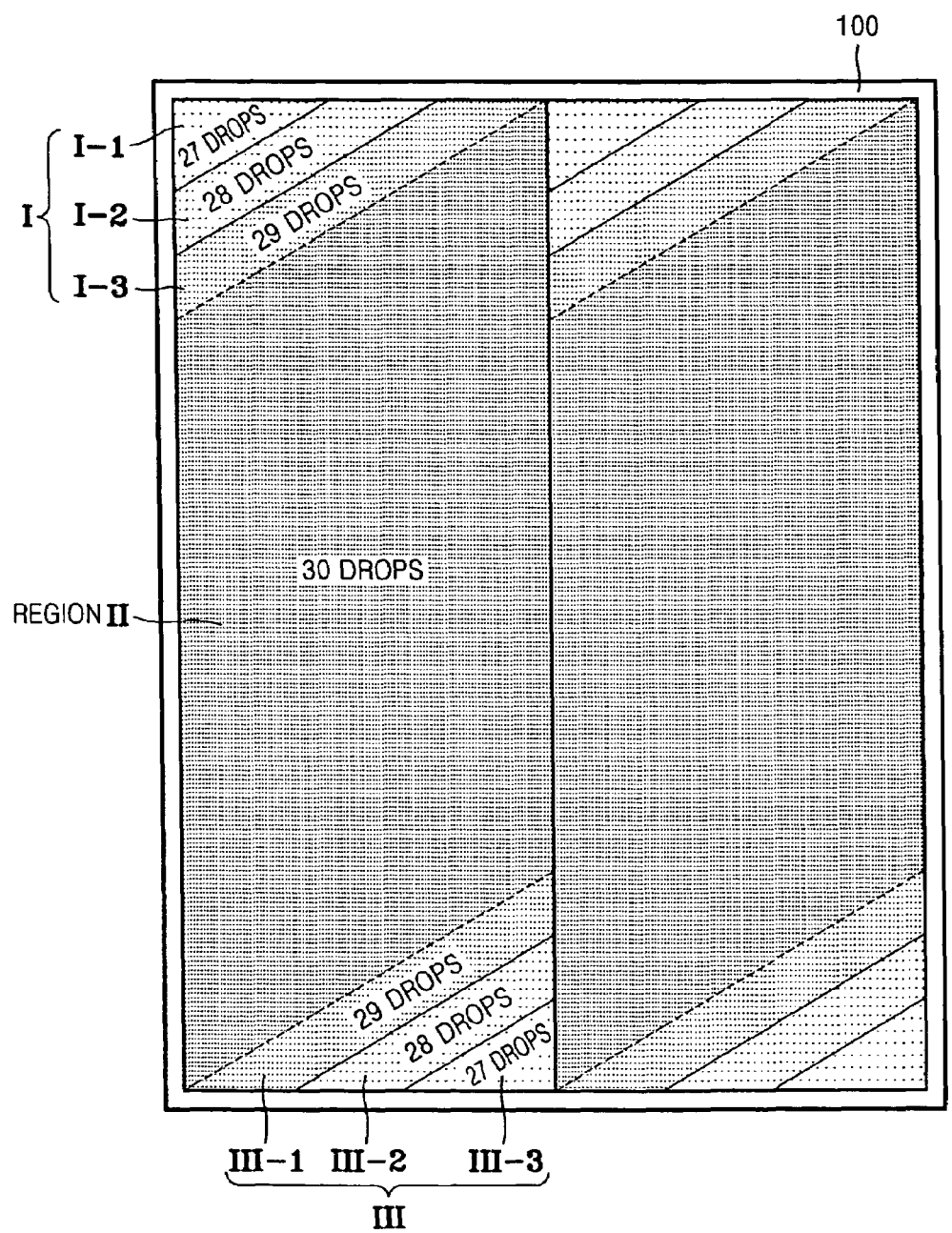
FIG. 5 is a diagram illustrating the number of ink drops discharged from the inkjet head in each region of the color filter of FIG. 4 according to an embodiment of the present general inventive concept.
Figure 6:
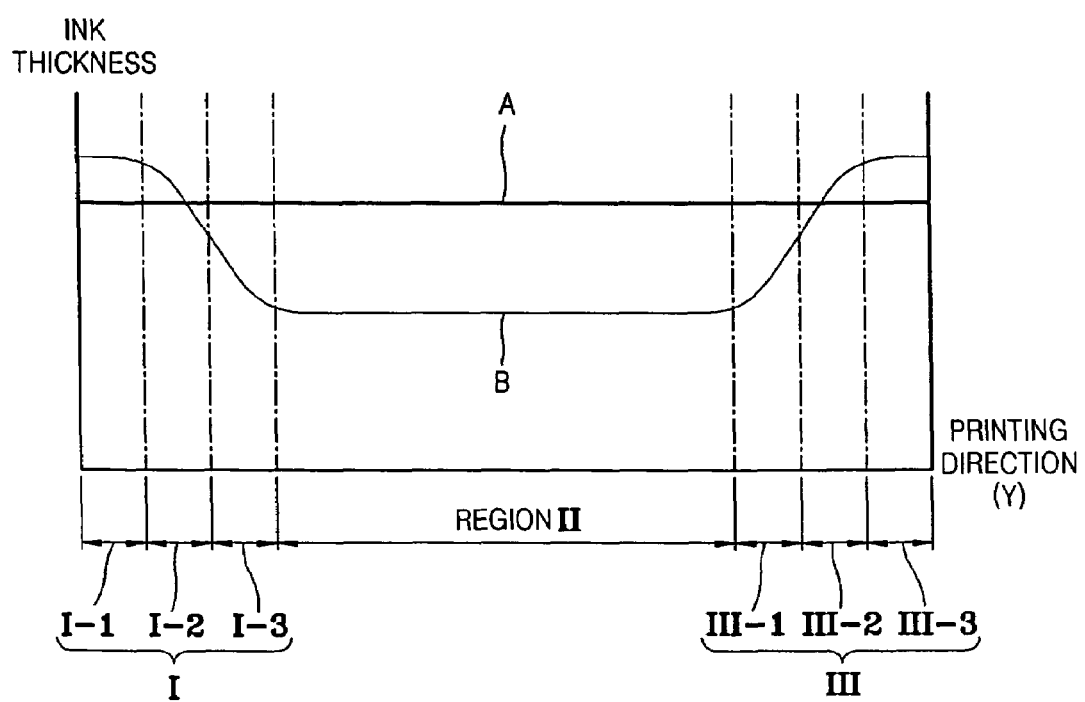
FIG. 6 is a graph illustrating a thickness of ink discharged into pixel areas of the color filter of FIG. 4, corresponding to the number of ink drops in FIG. 5 along the printing direction Y, according to an embodiment of the present general inventive concept.

FIG. 5 is a diagram illustrating the number of ink drops discharged from the inkjet head to each region of the color filter 100 according to an embodiment of the present general inventive concept. FIG. 6 is a graph illustrating a thickness of ink discharged along the printing direction into pixel areas 111 of the color filter 100 corresponding to the number of ink drops in FIG. 5 according to an embodiment of the present general inventive concept.

Referring to FIGS. 4, 5, and 6, the number of ink drops discharged from each of the nozzles 210, 220, 230, and 240 in each of the regions I, II, and III of the color filter 100 when a predetermined combination of the nozzles 210, 220, 230, and 240 are simultaneously turned on may be controlled so as to maintain a uniform ink thickness over the entire color filter 100 as illustrated by a solid line A in FIG. 6. For example, the predetermined combination of the nozzles may be nozzle 210, nozzles 210 and 220, nozzles 210, 220, and 230, nozzles 210, 220, 230, and 240, nozzles 220, 230, and 240, nozzles 230 and 240, and nozzle 240. However, the present general inventive concept is not limited thereto, and other predetermined combination of nozzles simultaneously turned on may be controlled.

Referring to FIG. 5, a method of maintaining the uniform thickness of ink, which is filled in the plurality of pixels 111, by controlling the number of ink drops according to an embodiment of the present general inventive concept, can be applied to a case where each amount of ink discharged from the nozzles 210, 220, 230, and 240 gradually decreases or increases as the number of simultaneously turned-on nozzles increases or decreases, respectively.

In the region II of the color filter 100, all of the nozzles 210, 220, 230, and 240 are simultaneously turned on, so the number of the ink drops discharged from each of the nozzles 210, 220, 230, and 240 is set to a maximal value.

Region I of the color filter 100 may include sub-regions I-1, I-2, and I-3, which are divided along a moving direction of the inkjet head 200 over the color filter 100.

In the sub-region I-1, only the first nozzle 210 is turned on while the first and second nozzles 210 and 220 are turned on simultaneously in the sub-region I-2. In the sub-region I-3, the first, second, and third nozzles 210, 220, and 230 are turned on simultaneously.

The number of ink drops discharged from simultaneously turned-on nozzles in each sub-region I-2, I-2, or I-3 gradually increases as the inkjet head 200 moves from the sub-region I-1 to the sub-region I-3. At this time, the number of the ink drops discharged in each sub-region I-1, I-2, or I-3 may be less than that in the region II.

For example, in the region II, the number of the ink drops discharged from each nozzle may be 30, and the number of the ink drops discharged from each nozzle is 27 in the sub-region I-1, 28 in the sub-region I-2, and 29 in the sub-region I-3. In the example, the number of ink drops discharged from each nozzle increases gradually from the sub-region I-1 to the sub-region I-3.

In other words, the amount of the ink discharged from the same nozzle may be changed based on the number of simultaneously turned-on nozzles among the nozzles 210, 220, 230, and 240, so that the total amount of ink discharged from the same nozzle is controlled to be constant according to the changed number of the ink drops, and the amount of ink filled in the respective pixel areas 111 of the color filter 100 is maintained to be constant through the regions I, II, and III.

The region III of the color filter 100 includes sub-regions III-1, III-2, and III-3 of the color filter 100, which are divided along the moving direction Y of the inkjet head 200.

In the region III-1, the second, third, and fourth nozzles 220, 230, and 240 are turned on simultaneously. In the region III-2, the third and fourth nozzles 230 and 240 are turned on simultaneously, and only the fourth nozzle 240 is turned on in the region III-3.

The number of ink drops discharged from the simultaneously turned-on nozzles in each sub-region III-1, III-2, or III-3 gradually decreases as the inkjet head 200 moves from the sub-region III-1 to the sub-region III-3. At this time, the number of ink drops discharged in each sub-region III-1, III-2, or III-3 may be less than that in the region II.

For example, in the region II, the number of ink drops discharged from each nozzle may be 30, and the number of ink drops discharged from each nozzle is 29 in the sub-region III-1, 28 in the sub-region III-2, and 27 in the sub-region III-3. In the example, the number of ink drops discharged from each nozzle decreases gradually from the sub-region III-1 to the sub-region III-3 as illustrated in FIG. 5.

In this case, the numbers of the ink drops discharged in the sub-regions I-1 and III-3 are the same, and the numbers of ink drops discharged in the sub-regions I-2 and III-2 are the same. In addition, the numbers of ink drops discharged in the sub-regions I-3 and III-1 are the same. The numbers of the ink drops in these pairs of sub-regions may be the same since the number of nozzles simultaneously turned-on in each pair of sub-regions is the same.

Referring to FIG. 6, the ink thickness in each pixel formed by controlling the number of ink drops discharged in each region of the color filter 100 according to an embodiment of the present general inventive concept is the same along the printing direction Y of the inkjet head 200 as illustrated by a solid line A in FIG. 6.

This is different from a conventional case where the ink thickness of each pixel is non-uniform along the printing direction Y of the inkjet head 20 when the same number of ink drops is discharged from each nozzle regardless of the number of simultaneous turned-on nozzles as illustrated by a curve B in FIG. 6.

Figure 7:
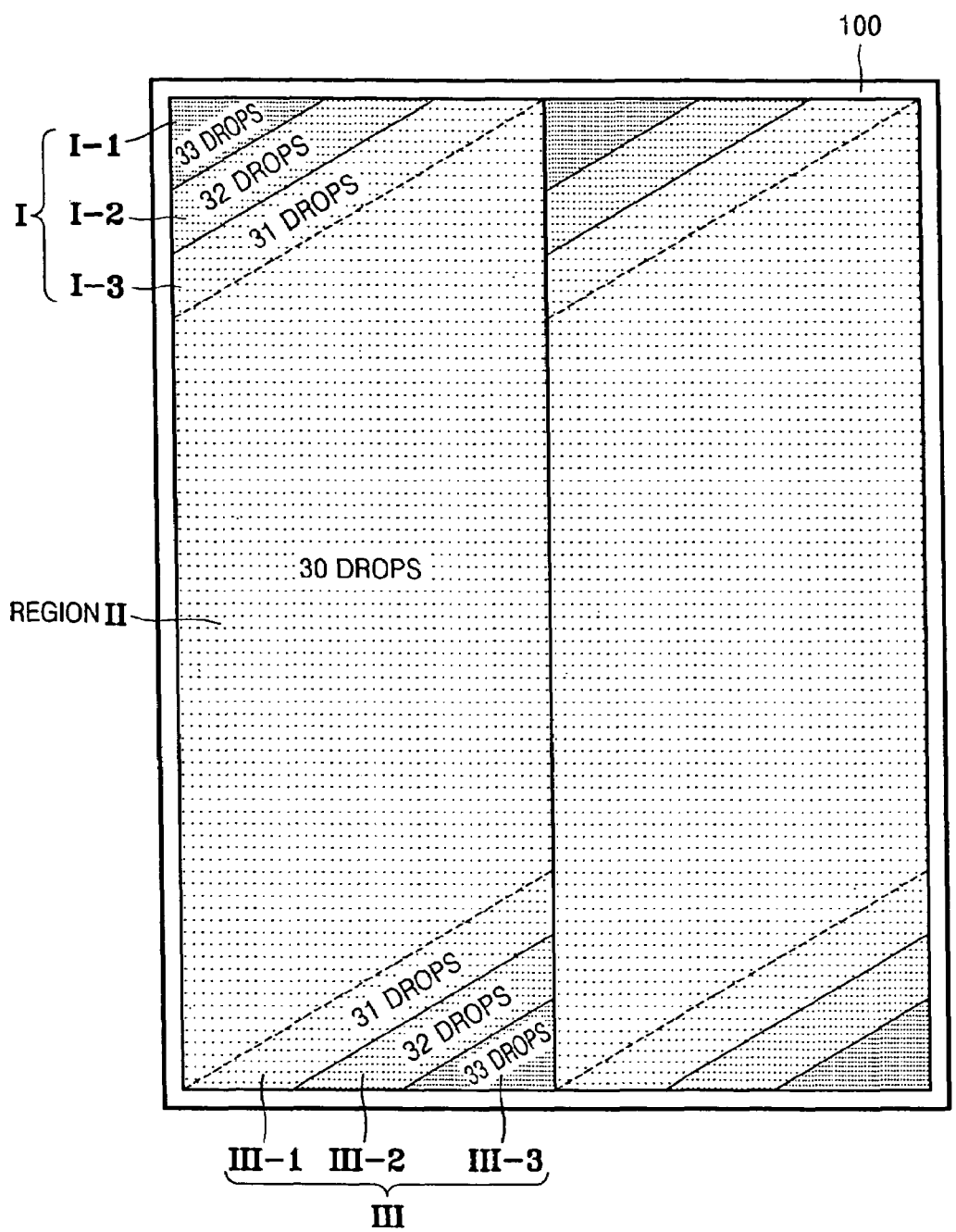
FIG. 7 is a diagram illustrating the number of ink drops discharged from the inkjet head in each region of the color filter of FIG. 4 according to another embodiment of the present general inventive concept.

FIG. 7 is a diagram illustrating the number of ink drops discharged from the inkjet head 200 into each region of the color filter 100 according to another embodiment of the present general inventive concept.

Referring to FIG. 7, a method of maintaining the uniform thickness of ink, which is filled in the plurality of pixel areas 111, by controlling the number of ink drops according to an embodiment of the present general inventive concept, can be applied to a case where each amount of the ink discharged from the nozzles 210, 220, 230, and 240 gradually increases or decreases as the number of simultaneously turned-on nozzles increases or decreases, respectively.

In the region II of the color filter 100, all of the nozzles 210, 220, 230, and 240 are simultaneously turned-on, so that the number of the ink drops discharged from each of the nozzles 210, 220, 230, and 240 may be set to a minimal value.

The region I of the color filter 100 includes sub-regions I-1, I-2, and I-3, which are divided along a moving direction of the inkjet head 200 above the color filter 100.

In the sub-region I-1, only the first nozzle 210 is turned on, while the first and second nozzles 210 and 220 are turned on simultaneously in the sub-region I-2. In the sub-region I-3, the first, second, and third nozzles 210, 220, and 230 are turned on simultaneously.

The number of ink drops discharged from simultaneously turned-on nozzles in each sub-region I-2, I-2, or I-3 gradually decreases as the inkjet head 200 moves from the sub-region I-1 to the sub-region I-3. At this time, the number of the ink drops discharged in each sub-region I-1, I-2, or I-3 may be greater than that in the region II.

For example, in the region II, the number of the ink drops discharged from each nozzle may be 30, and the number of the ink drops discharged from each nozzle is 33 in the sub-region I-1, 32 in the sub-region I-2, and 31 in the sub-region I-3. In the example, the number of ink drops discharged from each nozzle decreases gradually from the sub-region I-1 to the sub-region I-3 as illustrated in FIG. 7.

In other words, the amount of the ink discharged from the same nozzle changes based on the number of simultaneously turned-on nozzles among the nozzles 210, 220, 230, and 240, so that the number of the ink drops is controlled to keep constant the total amount of ink discharged from the same nozzle.

The region III of the color filter 100 includes sub-regions III-1, III-2, and III-3 of the color filter 100, which are divided along the moving direction Y of the inkjet head 200.

In the sub-region III-1, the second, third, and fourth nozzles 220, 230, and 240 are turned on simultaneously. In the sub-region III-2, the third and fourth nozzles 230 and 240 are turned on simultaneously, and only the fourth nozzle 240 is turned on in the sub-region III-3.

The number of ink drops discharged from simultaneously turned-on nozzles from each sub-region III-1, III-2, or III-3 gradually increases as the inkjet head 200 moves from the sub-region III-1 to the sub-region III-3. At this time, the number of ink drops discharged in each sub-region III-1, III-2, or III-3 may be greater than that in the region II.

For example, in the region II, the number of the ink drops discharged from each nozzle may be 30, and the number of the ink drops discharged from each nozzle is 31 in the sub-region III-1, 32 in the sub-region III-2, and 33 in the sub-region III-3. In the example, the number of ink drops discharged from each nozzle increases gradually from the sub-region III-1 to the sub-region III-3.

In the above example, the numbers of the ink drops discharged in the sub-regions I-1 and III-3 are the same, and the numbers of the ink drops discharged in the sub-regions I-2 and III-2 are the same. In addition, the numbers of the ink drops discharged in the sub-regions I-3 and III-1 are the same. The numbers of the ink drops in these pairs of sub-regions are the same since the number of nozzles simultaneously turned-on in each pair of sub-regions is the same.

Figure 8:
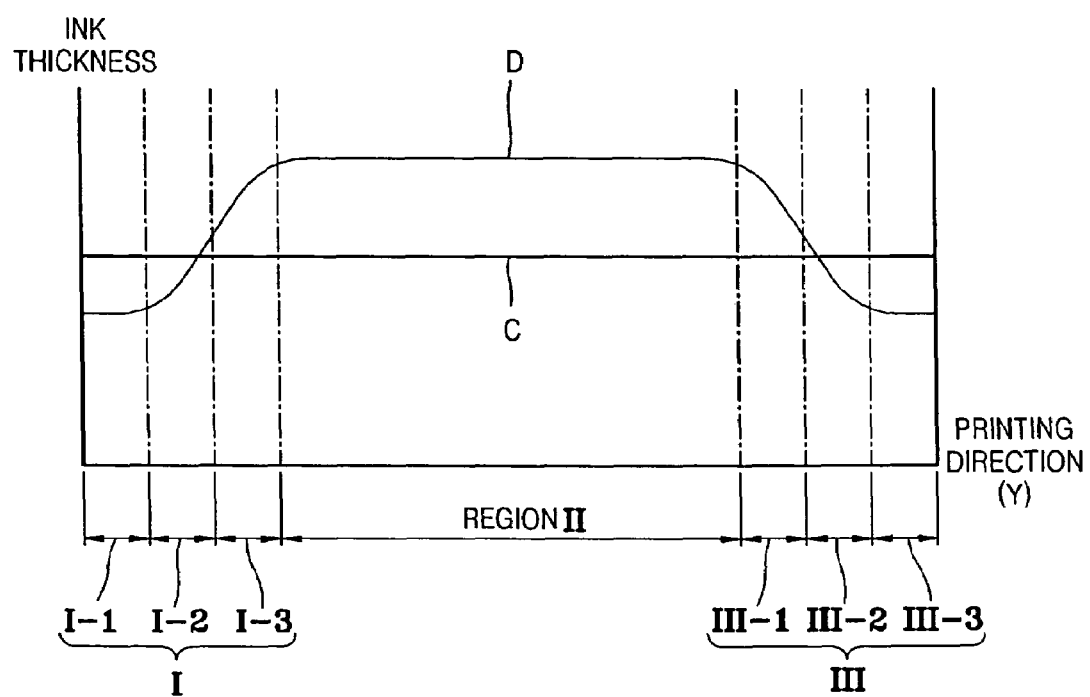
FIG. 8 is a diagram illustrating a thickness of ink discharged into pixel areas of the color filter of FIG. 4, corresponding to the number of the ink drops illustrated in FIG. 7 along the printing direction, according to another embodiment of the present general inventive concept.

FIG. 8 is a graph illustrating a thickness of ink discharged into pixel areas 111 of the color filter 100, corresponding to the number of the ink drops illustrated in FIG. 7 along the printing direction.

Referring to FIG. 8, the ink thickness of each pixel formed by controlling the number of the ink drops discharged in each region according to another embodiment of the present general inventive concept is the same along the printing direction Y of the inkjet head 200 as illustrated by a solid line C in FIG. 8.

This is different from a conventional case where the ink thickness of each pixel is non-uniform along the printing direction Y of the inkjet head 20 when the same number of ink drops is discharged from each nozzle regardless of the number of simultaneously turned-on nozzles as illustrated by a curve D in FIG. 8.

According to the present general inventive concept, the thickness of the ink filled in each pixel area can be controlled by changing the amount of the ink and the number of the ink drops which is discharged from each nozzle. The numbers and indications of the graphs in FIGS. 5 to 8 are only examples, and the present general inventive concept is not limited thereto.

A column of pixel areas 111 in the Y direction are filled with ink using the method described above, and the method is repeated to fill another adjacent column of pixel areas 111 in the Y direction with ink while the inkjet head 200 is sequentially moved in the direction X.

The amount of the ink discharged from each nozzle can be controlled by simultaneously controlling the voltage applied to each nozzle together with controlling the number of the ink drops according to the embodiments of the present general inventive concept. The amount of the ink can be precisely controlled by simultaneously controlling the voltage applied to each nozzle and the number of the ink drops.

As described above, by using the method of manufacturing a color filter using an inkjet according to an embodiment of the present general inventive concept, it is possible to maintain a uniform ink thickness over the entire color filter easily by simply controlling the number of ink drops discharged from each nozzle, which is very economical.

In addition, the uniformity of brightness of the color filter is improved, since the ink thickness is uniform over the entire color filter.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of manufacturing a color filter using an inkjet, the method comprising:
   discharging ink into a plurality of pixel areas divided by a matrix using an inkjet head comprising a plurality of nozzles is moved above the color filter while being tilted by a predetermined angle with respect to the color filter, the color filter comprising:
   a first region in which the plurality of nozzles are sequentially turned on,
   a second region in which all of the plurality of nozzles are turned on, and
   a third region in which the plurality of nozzles are sequentially turned off; and
   when an amount of ink discharged from each of the plurality of nozzles gradually increases and decreases as the number of simultaneously turned-on nozzles increases and decreases, respectively, the number of ink drops discharged from each of the plurality of nozzles gradually decreasing and increasing in the first region and in the third region, respectively, to maintain a uniform ink thickness over the entire color filter.

2. The method of claim 1, wherein, when the number of ink drops discharged from each of the plurality of nozzles in the second region is set to a minimal value, the numbers of ink drops discharged from each of the plurality of nozzles in the first and third regions are larger than the minimal value, respectively.

3. The method of claim 1, wherein the number of ink drops discharged from each of the plurality of nozzles in the first region gradually decreases corresponding to the number of simultaneously turned-on nozzles.

4. The method of claim 1, wherein the number of ink drops discharged from each of the plurality of nozzles in the third region gradually increases corresponding to the number of simultaneously turned-on nozzles.

5. The method of claim 1, wherein the numbers of ink drops in the first and third regions corresponding to the number of the simultaneously turned-on nozzles are the same.

6. The method of claim 1, wherein voltages applied to each of the plurality of nozzles are adjusted to control the amount of the ink discharged from the plurality of the nozzles.

7. A method of manufacturing a color filter using an inkjet, the method comprising:
   discharging ink into a plurality of pixel areas divided by a matrix using an inkjet head comprising a plurality of nozzles is moved above the color filter while being tilted by a predetermined angle with respect to the color filter, the color filter comprising:
   a first region in which the plurality of nozzles are sequentially turned on,
   a second region in which all of the plurality of nozzles are turned on, and
   a third region in which the plurality of nozzles are sequentially turned off; and
   when an amount of ink discharged from each of the plurality of nozzles is gradually changed according to the number of turned-on nozzles, gradually changing the number of ink drops discharged from each of the plurality of nozzles in the first region and in the third region to maintain a uniform ink thickness over the entire color filter.

8. The method of claim 7, wherein the changing of the number of ink drops comprises gradually decreasing the number of ink drops discharged from the nozzles in the first region when the amount of ink discharged from each nozzle gradually increases in the first region as the number of simultaneously turned-on nozzles gradually increases.

9. The method of claim 7, wherein the changing of the number of ink drops comprises gradually increasing the number of ink drops discharged from the nozzles in the first region when the amount of ink discharged from each nozzle gradually decreases in the first region as the number of simultaneously turned-on nozzles gradually increases.

10. The method of claim 7, wherein the changing of the number of ink drops comprises gradually decreasing the number of ink drops discharged from the nozzles in the third region when the amount of ink discharged from each nozzle gradually increases in the third region as the number of simultaneously turned-on nozzles gradually increases.

11. The method of claim 7, wherein the changing of the number of ink drops comprises gradually increasing the number of ink drops discharged from the nozzles in the third region when the amount of ink discharged from each nozzle gradually decreases in the third region as the number of simultaneously turned-on nozzles gradually increases.

12. The method of claim 7, wherein the numbers of ink drops in the first and third regions corresponding to the number of the simultaneously turned-on nozzles are the same.

13. The method of claim 7, wherein the number of ink drops discharged from each of the plurality of nozzles in the second region is set to a minimal value, and the number of drops discharged from each of the plurality of nozzles in the first and third regions are larger than the minimal value, respectively.

14. The method of claim 7, wherein the number of ink drops discharged from each of the plurality of nozzles in the second region is set to a maximal value, and the number of drops discharged from each of the plurality of nozzles in the first and third regions are less than the maximal value, respectively.

* * * * *